D. M. BARRINGER.
NUT LOCK.
APPLICATION FILED MAY 25, 1915.

1,183,619.

Patented May 16, 1916.

WITNESSES:

INVENTOR
D. M. Barringer.
BY
ATTORNEY

UNITED STATES PATENT OFFICE.

DANIEL M. BARRINGER, OF GREENSBORO, NORTH CAROLINA.

NUT-LOCK.

1,183,619.   Specification of Letters Patent.   Patented May 16, 1916.

Application filed May 25, 1915. Serial No. 30,271.

*To all whom it may concern:*

Be it known that I, DANIEL M. BARRINGER, a citizen of the United States, and a resident of Greensboro, in the county of Guilford and State of North Carolina, have invented a new and Improved Nut-Lock, of which the following is a full, clear, and exact description.

My invention is an improvement in the type of nut-locks in which the locking device is provided with a spring tongue adapted to engage a nut.

The improvement is embodied in the novel construction and combination of parts hereinafter described, and illustrated in the accompanying drawings, in which:—

Figure 1:
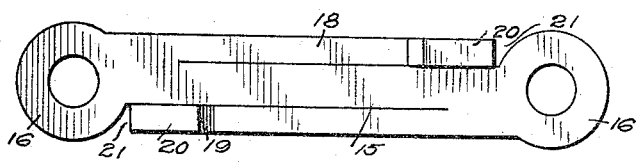
Figure 2:
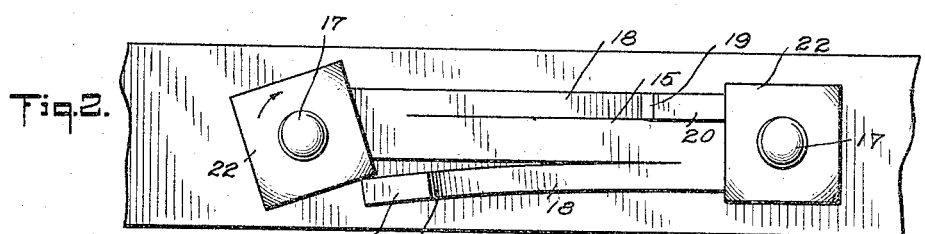
Figure 3:
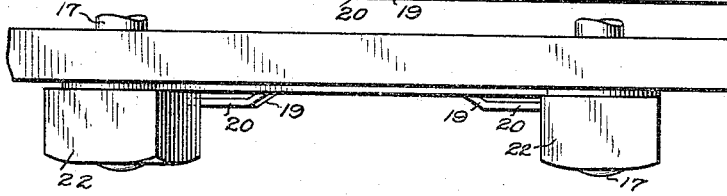

Figure 1 is a face view of one form of the invention detached from the bolts; Fig. 2 is a similar view of the same device shown in application to a fish plate or the like, one end being in locked position and the other being in position it assumes when the nut is being screwed on the bolt; Fig. 3 is a plan view of the same parts as shown in Fig. 2.

In the drawing I show a locking device comprising a body 15 of sheet metal and having an eye 16 at each end adapted to receive therethrough the threaded end of a bolt 17. These fastening devices may be made of standard lengths or sizes according to the size of the bolts whose nuts are to be locked. Adjacent each end of the body 15 is formed a keeper 18 which is of elastic or spring material. The main portion of the keeper lies normally in the same plane and closely against the main portion of the body 15. The free end, however, of the keeper is offset by bending it outwardly from such plane as shown at 19 and is thence bent again so as to lie in a plane parallel to the first mentioned plane, the flat portion 20 of the end ending at 21 so as to abut squarely against the adjacent corner of a nut 22 to prevent the reverse turning thereof on the bolt. As indicated at the left hand end of Fig. 2, the nut being turned to tight position against the eye 16 of the locking device causes the adjacent end 20 of the keeper 18 to bend outwardly at each quarter turn of the nut, and as the corner of the nut passes the free end of the keeper, the keeper snaps back into place until the next corner comes and turns it outwardly as before. The outwardly directed portion 19 throwing the keeper end 20 into a plane parallel to but spaced from the plane of the main body 15 insures a positive abutting contact between the end of the member 20 and the corner of the nut.

I claim:—

The improved nut-lock formed of spring material, having a flat body with bolt hole at one end, and a flat side finger parallel to said body and whose free end is offset laterally in a plane parallel to that of the body, as described.

DANIEL M. BARRINGER.

Witnesses:
D. C. CASTEUR,
R. D. WYANT.

Copies of this patent may be obtained for five cents each, by addressing the "Commissioner of Patents, Washington, D. C."